(12) United States Patent
Wolff (10) Patent No.: US 8,578,957 B2
(45) Date of Patent: Nov. 12, 2013

(54) SINGLE SEAL BREAKAWAY CONNECTOR

(75) Inventor: Brian P. Wolff, Raytown, MO (US)

(73) Assignee: Husky Corporation, Pacific, MO (US)

( * ) Notice: Subject to any disclaimer, the term of this patent is extended or adjusted under 35 U.S.C. 154(b) by 112 days.

(21) Appl. No.: 13/199,256

(22) Filed: Aug. 24, 2011

(65) Prior Publication Data

US 2013/0048110 A1 Feb. 28, 2013

(51) Int. Cl.
*F16K 17/14* (2006.01)
*F16K 17/40* (2006.01)
*E03B 1/00* (2006.01)
*F16L 37/32* (2006.01)

(52) U.S. Cl.
USPC ............. 137/68.15; 137/68.14; 137/614.04

(58) Field of Classification Search
USPC ............. 137/68.15, 68.14, 614.04; 285/2, 3, 285/353, 355, 357; 277/609, 616, 630, 637
See application file for complete search history.

(56) References Cited

U.S. PATENT DOCUMENTS

| | | | |
|---|---|---|---|
| 2,536,702 A | 1/1951 | Schweiwer | |
| 2,599,935 A | 6/1952 | Pasker | |
| 2,631,872 A | 3/1953 | Wurmser | |
| 2,642,297 A | 6/1953 | Hanna | |
| 2,777,716 A | 1/1957 | Gray | |
| 2,860,893 A | 11/1958 | Clark | |
| 3,138,393 A | 6/1964 | Livingston | |
| 3,317,220 A | 5/1967 | Bruning | |
| 3,334,860 A | 8/1967 | Bolton, Jr. | |
| 3,715,099 A | 2/1973 | Shendure | |
| 3,836,114 A | 9/1974 | Norton et al. | |
| 3,918,679 A | 11/1975 | Silvana | |
| 4,060,219 A | 11/1977 | Crawford | |
| 4,064,889 A | 12/1977 | Gayle et al. | |
| 4,070,003 A | 1/1978 | Shames et al. | |
| 4,098,438 A | 7/1978 | Taylor | |
| 4,124,228 A | 11/1978 | Morrison | |
| 4,289,334 A * | 9/1981 | Riley | 285/55 |
| 4,307,744 A | 12/1981 | Marrison | |
| 4,392,513 A | 7/1983 | Parrish | |
| 4,617,975 A | 10/1986 | Rabushka et al. | |
| 4,667,883 A | 5/1987 | Fink, Jr. | |
| 4,674,525 A * | 6/1987 | Richards et al. | 137/68.15 |
| 4,691,941 A | 9/1987 | Rabushka et al. | |
| 4,827,977 A | 5/1989 | Fink, Jr. | |
| 4,828,183 A | 5/1989 | Fink, Jr. | |
| 5,365,973 A | 11/1994 | Fink, Jr. et al. | |
| 6,182,695 B1 | 2/2001 | Coates, III et al. | |
| 6,192,934 B1 | 2/2001 | Coates, III et al. | |
| 6,550,817 B1 | 4/2003 | Mitchell | |
| 7,575,023 B2 | 8/2009 | Fraser | |
| 2006/0243332 A1* | 11/2006 | Harvey et al. | 137/614.04 |
| 2007/0222159 A1* | 9/2007 | Baxi et al. | 277/365 |

* cited by examiner

*Primary Examiner* — John K Fristoe, Jr.
*Assistant Examiner* — Michael R Reid
(74) *Attorney, Agent, or Firm* — Paul M Denk (57) ABSTRACT

A safety breakaway connector begins with a body that receives a cooperating insert providing a coaxial flow path. The body has threads, a collar leading to an extension, and a hollow interior. The insert also has threads, a collar that leads to an inner wall, and a hollow interior. The inner wall fits snugly within the extension of the body. Generally, the insert simply slides into and interconnects with the body for quick installation. Two spaced apart biased check valves remain slightly outwardly from the narrow portions of the body and insert. A guard covers the body. Upon the application of the minimum force, the insert separates from the body, and the check valves abruptly close preventing further leakage of fuel. Alternatively, a strategically located O-ring or gasket seals the various components and withstands pressure variations.

6 Claims, 6 Drawing Sheets

SINGLE SEAL BREAKAWAY CONNECTOR

CROSS-REFERENCE TO RELATED PATENTS

The subject matter of this application is related to the subject matter of the patents of Arthur C. Fink, Jr. and Thomas O. Mitchell, pertaining to Breakaway Concentric Hose Connector, now U.S. Pat. No. 5,365,973, Breakaway Hose Connector now U.S. Pat. No. 4,827,977, and Butterfly Valve for Fluid Flow Line, now U.S. Pat. No. 4,667,883, and owned by a common assignee. Further, the subject mater of this application is related to the pending application having Ser. No. 12/381,922, filed on Mar. 18, 2009, and which claim priority upon U.S. Pat. No. 7,575,023, all owned by a common assignee.

BACKGROUND OF THE INVENTION

This single seal breakaway connector relates in general to means for allowing fuel to flow through a line but abruptly stopping fuel passage through the line upon application of sufficient axial force. Such axial force often arises when an errant motorist drives away from a fuel pump. The connector sees use in a flow line, such as a gasoline line connecting to a nozzle used by motorists for fuel dispensing at a service station. The connector more specifically relates to improvements within it useful for installing upon coaxial hoses, fittings, and nozzles and later when a severance occurs along the line and when a loss of fuel may be encountered, such as when a vehicle drives off with the nozzle inadvertently still inserted within the vehicle fuel tank. Unique aspects of the present connector are a smooth exterior between its two halves, faces suitable for gripping by a wrench or other tool, and a flow constriction interior of the check valves. This invention is especially useful when applied in a fuel line at its connection to a pump, at a splice of two lines, or proximate a nozzle and it functions as a check valve to prevent fuel flow under emergency adverse conditions, particularly when the breakaway hose is disconnected.

Numerous connectors and valves in the prior art furnish a shut-off of fluid or other fuel flow, and more particularly, such mechanisms normally are utilized in lines where fuel may be flowing, and generally in those situations when the conduit comprises the fuel line leading from a fuel dispenser to its nozzle. For example, as can be seen in the U.S. Pat. No. 2,642,297, to Hanna, a breakaway coupling responds to tension in the line and is held together through a combination of male and female couplings, and detents that provide bearing engagement between the two components. In addition, the U.S. Pat. Nos. 4,617,975, and 4,691,941, to Rabushka, discloses various types of tension actuated uncouplers, for delivering gasoline to a vehicle from a gas pump. These prior patents portray devices that tend to leak, and when any internal pressure is exerted within the fuel line, such as may occur when pumping the fuel, excessive pressures may momentarily arise within the fuel line, and particularly at the location of the uncoupler, and in some instances, has actually forced the coupling device to prematurely come apart. These devices also require separation of their components by force oriented axially.

Existing fuel nozzles have a tip inserted into the vehicle fuel tank connected to valving and a handle opposite the tip as is commonly known. A fuel line connects to the handle generally collinear with the tip. Occasionally, careless motorists presume the fueling has finished or hear the nozzle click off and drive away from the pump with the nozzle still inserted in the filler neck of the vehicle fuel tank.

When the motorist drives the vehicle away, the nozzle moves with the vehicle and the fuel line extends and becomes taught between the nozzle and the pump. Once the fuel line becomes taught, a fortunate motorist may have the nozzle slip out of the filler neck and fall to the surface of the dispensing facility. More often, the taught fuel line causes the nozzle to bend, generally at the tip near the filler neck and the fuel line to strain its joint to the handle. A motorist that drives away abruptly or at high speed will rapidly damage the nozzle, the vehicle, and likely separate the fuel line from the nozzle. Most dispensing stations have a breakaway connector locating near where the fuel line connects to the pump. However, when a fuel line separates from the nozzle, existing breakaway connectors do not retain the fuel located in the line between the breakaway connector and the nozzle. In a drive away incident, the fuel remaining within the fuel line spills and becomes an environmental hazard. The dispensing facility then has a broken nozzle, separated hose, and a spill to clean up.

This predicament has generally been recognized by the Applicant as primarily occurring because flow lines lack the ability to rotate or to pivot into an orientation parallel to the direction of travel of a vehicle driving off from a pump. Further, flow lines lack a lightweight and compact breakaway connector capable of locating proximate the handle of a nozzle.

Additionally, prior art breakaway couplings may have unbalanced internal forces. In a drive off, greater fluid forces are exerted in one direction upon one part of the breakaway coupling than upon the other, and are inherent because of the construction of the breakaway coupling device. When spontaneous and unbalanced high pressures are encountered, the pressure exerted upon one component of the breakaway coupling device in one direction, substantially differs from the fluid pressure that may be exerted upon the other component of the breakaway coupling device, and therefore, this pressure disparity tends to force the coupler to prematurely separate, in an untimely and dangerous fashion. This can and has occurred particularly where the fluid pressure in the hose may undergo a phenomenon that is equivalent to "water hammer."

However, the present invention includes a smooth exterior, lightweight compact connector that connects flow line near the handle of a nozzle. Further, the connector induces forces to balance the internal forces applied against the main O ring seal, check valves, and separating pin. The main O ring seal endures fluid forces applied from fuel flowing through the invention. The two piece construction and shear pin construction provides counter forces that balance the fluid forces. Generally, the fluid forces tend to urge the connector apart while the forces induced by the present invention are equal in magnitude but opposite in direction to the fluid forces on the main O ring seal. The present invention neutralizes the fluid forces, minimizes nuisance breaks, stops fuel flow from a separated flow line, and minimizes handle damage.

The lengths of hose, fittings, and nozzles require connection among themselves and to service station pumping facilities. Hoses, fittings, and nozzles have couplings, often near the pump, that breakaway when an errant motorist drives away with a hose in a vehicle, and thus prevent a spill or worse, a fiery catastrophe. Until a breakaway, a coupling joins two sections of a fueling line and permits passage of fuel therethrough. As fuel pumps through the flow line, pressure spikes significantly and substantially throughout the hose, momentarily, and even at the location of the coupling, as when the flow is suddenly stopped, as for example, when the fuel tank is full. Hence, leakage at such couplers has frequently occurred in the field, and on occasion, untimely separation of the coupling has happened.

Couplings generally have two halves, a male fitting and a female fitting. The male fitting joins to a hose, fitting or nozzle and has an extended spacer means. The female fitting joins to a second hose, fitting, or nozzle and has a hollow cylindrical center to receive a spacer means. The female fitting engages the coupling by two diametrically opposed shear pins provided towards the rear of the female fitting and a plurality of locking bearings towards the front of the female fitting. Upon inserting the spacer means into the female fitting, the male fitting stands off from the female fitting until an errant motorist pulls the male fitting from the female fitting, the spacer or pin falls out, and the check valves close off the two pieces of hose formerly connected to the coupling.

Within the fittings of the coupling and the shear pins, pressure rises and falls depending upon the fuel flow through the coupling. Prior art designs provided an empty space between the locking bearings and the shear pins to absorb pressure fluctuations. In use though, the "water hammer" like effects during fueling induced excessive pressure upon the shear pins which would break repeatedly even with proper fueling and nozzle handling by motorists. Such nuisance breaks occur often and service stations then have to close a pump temporarily while the existing coupling is replaced.

DESCRIPTION OF THE PRIOR ART

Other patents that show various related uncoupling devices include the U.S. Pat. No. 4,449,545 to Vernor, disclosing a poppet valve having a conical surface that is disposed for seating upon a valve seat, when breakage occurs between the plug and socket of the shown valve. A great variety of other types of hose couplers are used in the art, as can be seen in the U.S. Pat. No. 2,777,716, to Gray, showing a socket type hose coupler with reciprocating detent. Another form of a quick disconnect coupler and safety check valve is shown in U.S. Pat. No. 4,060,219, to Crawford. The patent to Shames, U.S. Pat. No. 4,070,003 also discloses a coupler with automatic shut-off, but the sealing means provided therein has substantial size, and causes significant disruption to the normal flow of fluid through the coupler. Another type of valve assembly is shown in U.S. Pat. No. 4,307,744, to Morrison. An additional form of breakaway safety valve is shown in U.S. Pat. No. 4,064,889, to Gayle, wherein a ball valve prevents the discharge of gasoline vapors in a break.

Other patents showing decoupling devices, for use in flow lines, are shown in the patent to Scheiwer, U.S. Pat. No. 2,536,702 discloses a coupling for use within a flow line, and incorporating the ball type coupling members. Pasker, U.S. Pat. No. 2,599,935 discloses a hydraulic line coupling. Wurmser, U.S. Pat. No. 2,631,872 discloses a quick coupling device for flow lines. Clark, in his U.S. Pat. No. 2,860,893 shows a ball detent type coupling with breakaway feature. Burning, U.S. Pat. No. 3,317,220, shows a releasable fluid coupling. Bolton, Jr., in U.S. Pat. No. 3,334,860 discloses a fluid coupling. Shendure, U.S. Pat. No. 3,715,099 discloses a valved quick-disconnect coupling. Silvana, in U.S. Pat. No. 3,918,679 discloses a universal coupling that allows a flow line to rotate about its longitudinal axis but not turn upwards of ninety degrees. Taylor, in his U.S. Pat. No. 4,098,438 discloses a gasoline spill prevention system. The patent to Morrison, U.S. Pat. No. 4,124,228 shows a pressure-balanced fluid coupling. The patent to Parrish, U.S. Pat. No. 4,392,513, shows a quick disconnect safety coupling. A similar type of coupling assembly is shown in the patent to Norton, et al., U.S. Pat. No. 3,836,114. Livingston, in U.S. Pat. No. 3,138, 393 shows a coupling for substantially axially fixed conduits. Morrison, in U.S. Pat. No. 4,124,228 shows a pressure-balanced coupling. These are examples of various prior art breakaway coupling devices, primarily for use within a fluid flow line, and, some are of the breakaway type.

Other patents that have issued to the Assignee of the patent application herein include the patent to Fink, Jr., U.S. Pat. No. 4,827,977, upon a Breakaway Hose Coupling, the patent to Fink, Jr., et al., U.S. Pat. No. 5,365,973, for a Breakaway Concentric Hose Coupling, the patent to Coates, II, et al., U.S. Pat. No. 6,182,695, shows a further Breakaway Coupling and Coupler Therefore, and finally, the patent to Coates, et al., U.S. Pat. No. 6,192,934, shows an additional improvement in Breakaway Concentric Hose Coupling.

The difficulty in providing a single seal breakaway connector is also shown by the existing means to respond to nuisance breaks. Fuel line providers have added more shear pins to their coupling designs and locate their couplers near the pump rather than at the handle. The greater number of pins reduces the force absorbed by each pin. However, given enough cycles of fueling, the shear pins of greater number still fatigue and break unexpectedly. The variability in time to failure by fatigue leads to heavier and redundant coupling designs as the failure time defies accurate prediction. The coupler near the pump though permits fuel to escape from a hose that separates from the handle of a nozzle.

The present art overcomes the limitations of the prior art. Where, the present invention, a single seal breakaway connector, uses three equiangular spaced shear pins through fittings, a smooth exterior surface, and a constricted flow path within the connector thus reducing the incidence of nuisance breaks.

SUMMARY OF THE INVENTION

A safety breakaway connector begins with a body that receives a cooperating insert providing a coaxial flow path. The body has threads for connection to a hose or other fitting and a collar leading to an outer cylindrical wall. The body has a hollow interior that narrows opposite the threads. The insert also has threads for its connection to a hose or other fitting generally opposite that of the body. Inwardly from the threads, the insert has its collar that leads to an inner wall. The inner wall fits snugly within the outer wall of the body. The insert has a hollow interior that begins proximate the narrow portion of the body and widens to a constant diameter for the length of the body. Two spaced apart biased check valves remain slightly outwardly from the narrow portions of the body and insert. A guard covers the majority of the exterior of the body. Upon the application of the minimum force, the insert separates from the body, and the check valves abruptly close upon the narrow portions of the body and the insert preventing further leakage of fuel from their connect hoses or fittings.

Generally, the insert simply slides into and interconnects with the body for quick installation. One strategically located O-ring provides for fluidic sealing of the various components and withstands pressure variations. The present invention utilizes compact, strong biasing springs, or other mechanism that provides for its simple installation and eventual prompt closing of the check valves during an emergency.

This invention contemplates the formation of a single seal breakaway connector, of the type that may be used between two fuel lines, or hoses, and preferably a fuel line that conveys diesel exhaust fluid from a dispensing pump to and through a nozzle into a vehicle fuel tank. More preferably, this invention has been designed containing rather unique components that provide for and assure minimal turbulent flow through the check valves, a smooth exterior of the connector, and sealing with a single O-ring, and to prevent any leakage, or untimely disconnection from any internally generated forces, such as fluid flow or fluid spike pressures, that may spontaneously occur within the flow line, particularly when the flow of fuel suddenly stops. These features are primarily encountered when a vehicle drives away with the nozzle still in the filler neck and through balancing the internal forces created by fluid flow and static fluid pressure. The spring loaded check valves and shear pins balance the internal forces thus; the net force on the present invention dwindles to zero during pressure spikes.

And, even if any forces generated within the connector are not sufficient to cause an untimely decoupling, such internal pressures, and their misdirected forces, at least have a tendency to cause an incipient partial separation, and enough of an opening within the connector that undesirable leakage will at least occur. Hence, this current invention is constructed containing designed components, fabricated into a particular configuration, so that forces of a moving vehicle and any internal forces generated by the fluids passing within the flow line and the connector, are equal to each other, in opposite directions, and therefore, do not affect any substantial and unequal forces within the connector, keep the forces upon the connector in balance and thereby prevent untimely disconnection, or leakage.

Generally, as well known in the art, breakaway hose connectors are usually designed to provide separation when an errant driver pulls away from the dispensing facility pumps, with a gasoline nozzle and fuel line still connected within his vehicle's fuel tank. Under such a drive away situation, it is well documented that a nozzle starts to bend with its attached fuel line then abrupt disconnection of the fuel line at the nozzle occurs, and without the usage of some type of decoupling device, as explained in this current invention, fuel spills from the fuel line where it has separated from the nozzle until a breakaway connector ceases spillage of fuel upon the grounds of the service station, a very hazardous and disastrous predicament. Utilizing a breakaway connector of this invention, closes a fuel line abruptly that prevents and curtails further fuel flow from the fuel line where it separates from the nozzle, hose, or other fitting.

In addition, when prior art decoupling devices are affixed on a fuel flow line in routine use, internal pressure spikes or water hammer are generated within the fuel lines. The enormous pressures that instantaneously arise can cause an untimely separation of the prior art decoupling devices, or even at least some undesirable fuel leakage. Hence, this current invention has been designed to prevent any untimely disconnection, because of internal fluid pressures, and even to avoid leakage, by shear pins, check valves, and coil springs that equalize the disparity of any pressures generated within the connector, and thereby prevent spiked pressures from acting upon the connector, and thereby prevent is untimely disconnection.

These are conditions that can cause unwanted breakaway hose connector separations that result in equipment down time. In most instances, these nuisance breaks are caused by an immediate sudden build-up of pressure inside the fueling hose. A sudden pressure increase travels through the hose to the breakaway connector, and forces it apart. The sudden pressure build-up can occur when a nozzle abruptly shuts off while fueling under high volume or high pressure. The sudden accumulation of pressure in the fuel line can even cause the connector to separate. However, an even greater pressure can be created when a forced stretching of the hose constricts its internal diameter, as when being abusively used.

The breakaway hose connector of this invention eliminates these nuisance breaks. The breakaway connector of this invention will still separate under routine usage and under a drive away situation, when a predetermined force is exerted upon it. And, when this detrimental condition is encountered, the connector separates as planned, thus preventing a disastrous fuel spill. But, as explained, the connector of this device has further been improved so as not to prematurely separate when subjected to internal line shock pressures, a condition that generally causes unnecessary connector breaks, in the prior art.

In addition to the foregoing, the breakaway hose connector of this invention is one that quickly and easily disconnects after a drive away break. Upon breakage, the present connector becomes a minimal number of pieces and shrapnel ejected in the vicinity of the point of usage of the connector. Following a separation, the unit is replaced promptly for restoring a pump to operational status.

Therefore, it is an object of the invention to provide a new and improved single seal breakaway connector for fuel nozzles and fuel lines.

It is a further object of the present invention to place two hoses, two fittings, or a hose and a fitting, in line for the least turbulent flow of fuel.

It is a further object of the present invention to provide a single seal breakaway connector that operates upon one sealing O ring.

It is a further object of the present invention to provide a single seal breakaway connector that allows for grasping by a tool upon its center.

It is a further object of the present invention to dissipate any abrupt pressure spikes generated within the a single seal breakaway connector during its functioning within a flow line thus preventing undesirable fuel leakage or untimely separation of hoses and fittings.

It is a still further object of this invention to provide a single seal breakaway connector with internal features to isolate connected hoses and fittings from "water hammer" effects during fueling.

Another object of this invention is to provide a single seal breakaway connector where its sealing O-rings and gaskets are normally located within seats and cooperating with threads respectively during normal and routine usage of the adaptor when installed within a fluid flow line.

Another object is to provide such a single seal breakaway connector that is capable of connecting to a variety of hoses and fittings having female ends, threaded and unthreaded.

Another object is to provide such a single seal breakaway connector that has a low cost of manufacturing so the purchasing people and organizations can readily buy the adaptor through stores and supply sources.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
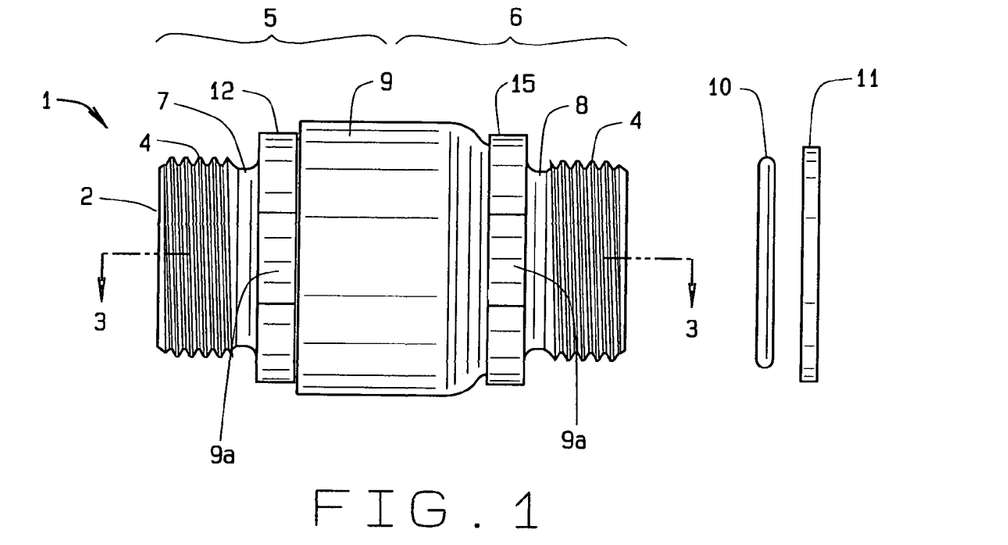
FIG. 1 shows a top view of the single seal breakaway connector.

The present invention 1 appears in FIG. 1, and has a generally hollow cylindrical form with a first end 2 and an opposite second end 3. As shown both ends 2, 3, have external threads 4 here shown as right hand, coarse. The threads continued for approximately four revolutions around the circumference of the ends. The threads extend inwardly upon a body 5 and an opposite insert 6. The body and the insert are hollow and have sufficient length for a solid connection of the connector to a hose or other fitting. Inwardly, the body and the insert each have a notch upon its perimeter, a first notch 7 at the end of the threads 4 on the body, and a second notch 8 opposite the first notch where the threads 4 end on the insert 6. The notches 7, 8 have a lesser diameter than the threads 4 and the ends 2, 3. Defining one side of each notch and opposite the threads, the body and the insert each have a collar. The body has a first collar 12 of a diameter noticeably greater than diameter of the threads. The collar has a thickness, along the length of the connector, suitable for gripping by a tool, such as a wrench or channel lock pliers. The collar extends around the circumference of the connector, that is, perpendicular to the length of the connector. The collar is generally round but for at least two faces 9a. The insert has a second collar 15 also of a diameter noticeably greater than diameter of the threads and generally the same diameter as the first collar for overall smoothness of the connector. This collar also has a thickness, and faces 9a suitable for gripping by a tool, such as a wrench or channel lock pliers. Shown generally between the collars 12, 15, the connector has a guard 9 generally cylindrical in shape with one beveled end. The guard has its beveled end placed inwardly from the second collar 15 and the remainder of the guard fits snugly upon the exterior of the body 5. As an alternate embodiment, the adaptor includes at least one O-ring 10 and at least one gasket 11. The O-ring has a generally O shape as later shown in FIG. 12 and a rounded cross section. The gasket also has a generally rounded shape as shown later in FIG. 12 but with a squared cross section.

Figure 2:
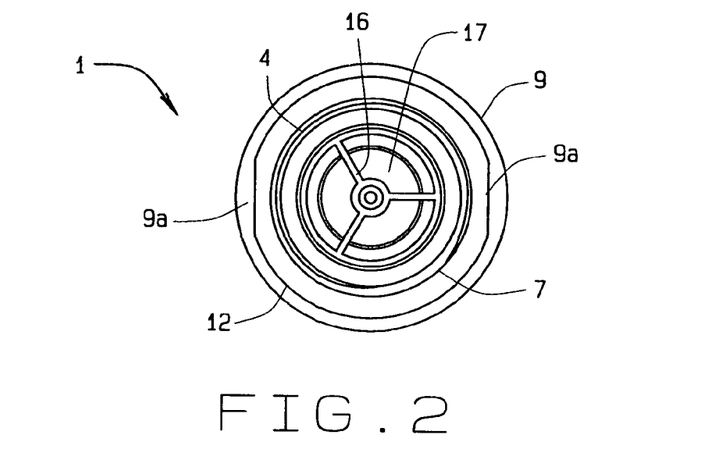
FIG. 2 shows an end view of the present invention.

Turning the connector ninety degrees out of the plane of FIG. 1, FIG. 2 shows an end view of the connector. The connector has its guard 9 defining the outermost diameter of the invention. Inwardly from the guard 9, the connector has a collar 12 generally round but for two mutually parallel faces 9a suitable for gripping by a tool. The collar has a generally flat surface that merges with a notch 7. Inwardly from the faces and outwardly from the notches, the body 5 has threads 4. Interiorly of the threads and within the body 5, a spider 16 has a generally hollow form with a round perimeter and three equiangular spaced legs converging in the center of the body. The spider supports a check valve 17 here shown in the open position for passage of fuel outwardly from the valve but within the round perimeter of the spider.

Figure 3:
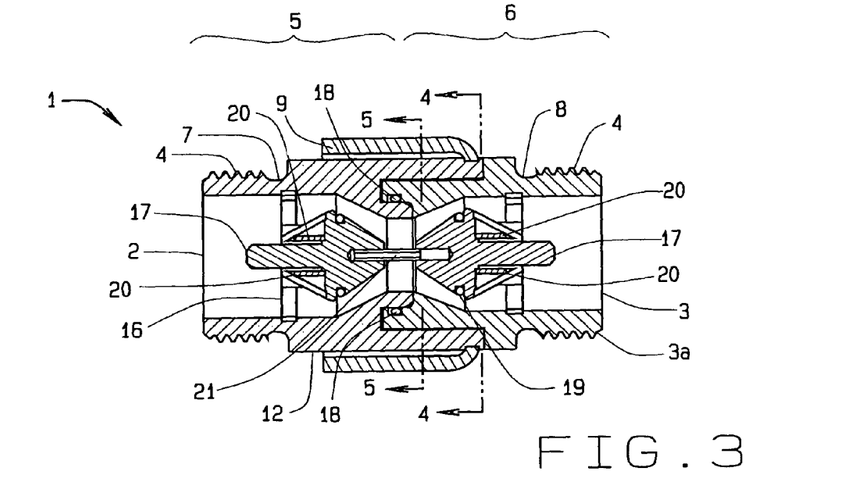
FIG. 3 shows a sectional view through the connector with the body to the left.

FIG. 3 provides a longitudinal section view through the connector with the body receiving the insert. As above, the body 5 has an open end 2 that has external threads 4. Inward of the threads, the body has the first notch 7 and then its collar 12. Forward of the collar, the body 24 extends inwardly of the guard 9 though the guard fits snugly upon the exterior of the body. The body receives a portion of the insert so that the second collar 15 has a flush fit to the end of the body 24. And as above, the insert 6 has its second end 3 here shown to the right, open to dispense fuel. The insert is generally hollow for the passage of fuel through it from the hollow body. The insert also has its external threads 4, the second notch 8, and the second collar 15.

The interior of the body has a generally constant diameter for most of its length however, the diameter tapers within the collar to its narrowest as later shown in FIG. 7. The interior of the insert begins at its narrowest proximate the body and widens until just before the second collar 15. From the second collar outwardly to the end 3, the interior of the insert has a constant diameter. The interior of the body 24 receives a spider 16, or snap cone, that generally has a wedge like fit into the body. The snap cone supports a check valve here shown generally outwardly of the reduction in diameter of the interior of the body. The check valve has a generally conical shape oriented with the narrow part of the shape towards the narrowest diameter of the body. Opposite the conical shape, the check valve has a stem, generally an elongated cylinder, which faces the inflow of fuel. Parallel to the stem, a pair of biasing members, or springs 20 exerts an expansive force between the snap cone and the check valve's conical section. The check valve resists the expansive force through a pin 21 inserted into the check valve of the body and pressing against check valve of the insert. The pin remains in place separating the conical portions of the check valves so that fuel may pass through the constricted diameters of the interior of the body and the insert. Upon application of sufficient axial force, approximately 250 pounds, the insert pulls away from the body just enough allowing the springs 20 to expand along the longitudinal axis of the connector. In doing so, the spring urges the conical portions of the check valves against the narrowing inner diameters of the body and the insert so that the check valves abut the interior of the body and the insert ceasing the flow of fuel through the body and the insert. Upon the widest diameter of each check valve, each check valve has a second O-ring 19 that seals the check valve to the interior of the body and the insert respectively. Then slightly outwardly of the narrowest diameter of the body, the body has an O-ring 18 that seals the body and the insert when joined and prior to separation.

Figure 4:
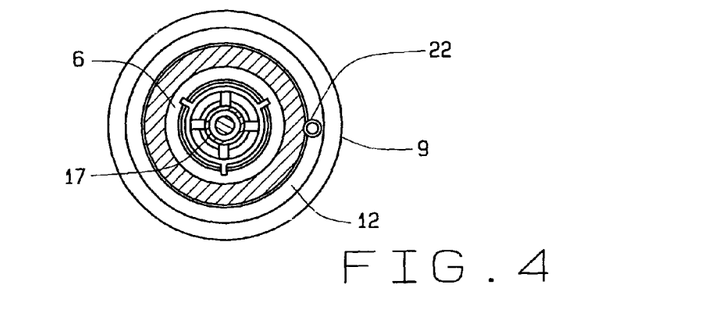
FIG. 4 describes a sectional view through the tip of the body.
Figure 6:
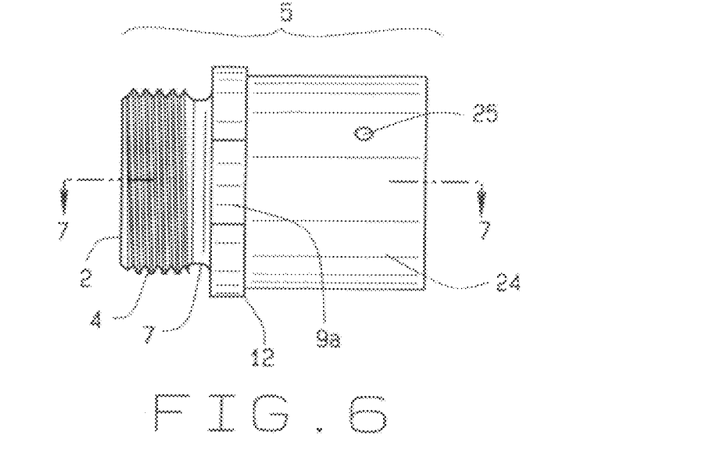
FIG. 6 shows a side view of the body.

Next, FIG. 4 then shows a section view through the insert 6 just between the second collar 15 and the beveled end of the guard 9. Within the guard, the body 5 has an extension of its collar 12 having a hollow round shape as later shown in FIGS.

6, 7. Inside of the collar 12, the body receives a portion of the insert 6, also of hollow round shape but of lesser diameter. Proximate the junction of the collar 12 and the insert 6, a coil pin 22 extends through the second collar 15, not shown, and into the extension of the collar 12. The coil pin fits within a tightly machined aperture in the collar 12 and second collar 15. The coil pin aids in assembly of the insert into the body during manufacturing of the connector 1. Within the insert, this figure shows a check valve 17 in the open position within a snap cone 16.

Figure 5:
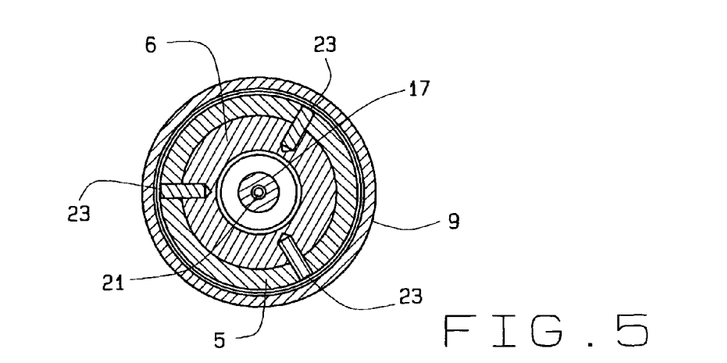
FIG. 5 shows a sectional view through the guard, the outer wall of the body, the inner wall of the insert, and a check valve.

Inwardly from FIG. 4, FIG. 5 shows a section through the body and the insert proximate the pin 21. Within the guard 9, the body has an extension of its collar 12. Within the body's collar 12, the insert fits snugly. Spaced in an equiangular relationship around the longitudinal axis of the connector, three shear pins 23 extend through the thickness of the extension of the collar 12 into the insert 6 but not through the entire thickness as shown. The shear pins fit within tightly machined apertures, are staked in place, and are generally perpendicular to the coil pin 22 previously shown. Within the insert, a portion of the conical check valve is shown generally centered between the shear pins. Within the center of the check valve, the pin 21 is shown as a round shape.

FIG. 6 shows the body 5 itself in more detail from the side. The body has its end 2, generally hollow with threads 4 upon the exterior. The threads continue inwardly to the first notch 7. The notch has lesser diameter than the threads. Opposite the threads, the notch merges with the first collar 12. The first collar has greater diameter than the threads and defines the widest portion of the body. The collar includes two faces, generally mutually parallel, one face 9a shown here. The collar has a thickness less than the length of the threads. Inwardly from the collar, the body has its outer extension 24. The outer extension has a generally round, hollow shape that receives the insert 6 within it. Opposite the collar, the outer extension opens for admission of the insert therein. Away from the collar and proximate the open end of the outer extension, an aperture 25 passes through the outer extension. The aperture 25 admits a shear pin as previously shown in FIG. 5.

Figure 7:
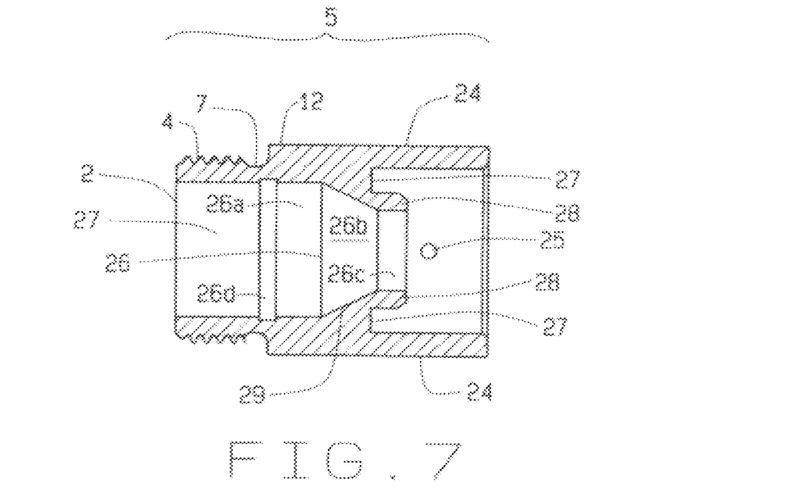
FIG. 7 illustrates a sectional view through the body.

FIG. 7 then provides a section view through the body shown in FIG. 6. The outer extension 24 extends from the collar opposite the threads 4 upon the end 2. The outer extension has a lesser thickness for approximately half of its length outwardly from the collar. Inside of the lesser thickness of the outer extension, the body has a generally cylindrical inner notch 27 here shown as two mutually parallel and spaced apart notches. The inner notch receives the insert as previously shown in FIG. 3. The inner notch in cooperation with the outer extension provides for a tight fit between the body and the insert. Inwardly from the lesser thickness of the outer extension and forming the interior of the inner notch 27, the body has a generally cylindrical inner extension 28, here shown as two mutually parallel and spaced apart extensions of lesser length than the outer extension. The inner extension is less than half of the length of the lesser thickness of the outer extension. The body away from the collar and proximate the open end of the wall, three spaced apart apertures 25 pass through the wall 30, in an equiangular spacing with the aperture 25 in the outer extension 24, previously shown. The apertures 25 admit three shear pins as previously shown in FIG. 5.

Opposite the outer extension, the body has its end 2 that receives fuel. The end has threads 4 for connection to a hose, fitting, or nozzle. The end has a generally hollow cylindrical form. Inside of the end, the body has a chamber 27a, generally smooth walled of a constant diameter. The chamber extends through the end for the length of the threads and the first notch. Proximate the collar, the chamber widens to a slightly larger diameter for a short distance, as at 26d, to receive the rounded perimeter of the snap cone 16. Within the collar, the chamber returns to its diameter until it merges with the throat 26 slightly outwardly from the collar. The wider diameter is shown as line 26a, that of the chamber. Inward of the wider diameter, the throat angles inwardly for a short distance to the second wider diameter, line 26b. From that line, the throat extends its second wider diameter as the inner diameter for the inner extension 28. The transition in chamber diameter from the throat 26 to the inner extension 28 occurs over a portion of the body called the constriction 29. The constriction reduces the diameter of the throat by approximately 40% as it transitions to the diameter of the inner extension. The constriction, being hollow and round like the throat allows for the passage of fuel through it at the least amount of adverse fluid flow effects.

Figure 8:
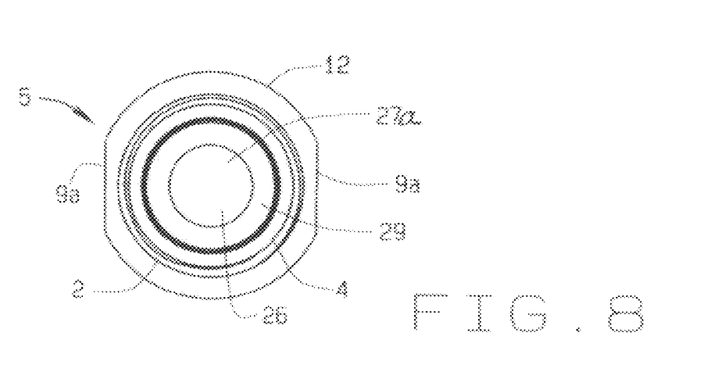
FIG. 8 describes an end view of the body with the collar in the background.

FIG. 8 then shows the body 5 from its end 2 where in the background, the body has its collar 12. The collar has a generally round shape but for two mutually parallel faces 9a here shown upon a common diameter. The faces receive the jaws of a tool, such as a wrench, for gripping of the body during installation at a service station. Inwardly from the collar, the body has its threads 4 upon the end 2. The threads extend around the circumference of the end in a generally tight helical manner. Inwardly from the threads and in the foreground of the figure, the end 2 shows the chamber 27 that admits fuel and then the constriction 29 that transitions the chamber to the diameter of the inner extension through the throat 26.

Figure 9:
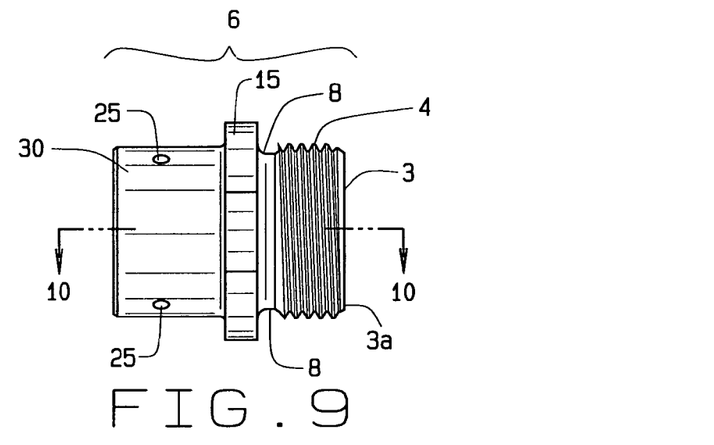
FIG. 9 shows a side view of the insert generally opposite that of the body.

FIG. 9 shows the insert 6 itself in more detail from a side view, generally opposite that of FIG. 6. The insert has its end 3, generally hollow with threads 4 upon the exterior. The end has a bevel, as at 3a, and the threads continue inwardly to the second notch 8. The second notch has lesser diameter than the threads. Opposite the threads, the second notch merges with the second collar 15 of generally the same outer diameter as the first collar 12 so that the body and the insert form a smooth exterior surface when joined. The second collar has a greater diameter than the threads and defines the widest portion of the insert. The collar includes two faces 9a, generally mutually parallel as later shown in FIG. 11. The second collar has a thickness less than the length of the threads. Inwardly from the collar, the insert has its wall 30. The wall has a generally round, hollow shape that fits within the outer extension 24 of the body as shown in FIG. 3. Opposite the second collar, the wall opens for fitting upon the inner notch 27 and the inner extension 28 of the body.

Figure 10:
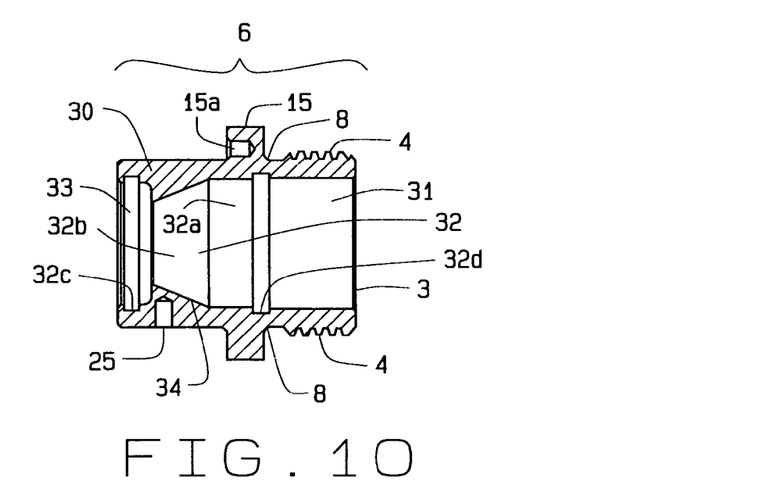
FIG. 10 illustrates a sectional view through the insert.

FIG. 10 then provides a section view through the insert above shown in FIG. 9. The insert has its collar 15 slightly off the center of its length. The collar has a generally smooth face towards the threads. Opposite the threads and towards the wall 30, the collar has at least one aperture 15a extending parallel to the length of the insert. The aperture does not penetrate through the collar towards the threads. The aperture receives the coil pin 22 of FIG. 4. Then the wall 30, generally hollow and cylindrical upon its exterior, extends from the second collar 15 opposite the threads 4 upon the end 3. The wall has a generally constant thickness but for the throat as later described.

Opposite the wall, the insert has its end 3 that dispenses fuel. The end has threads 4 for connection to a hose, fitting, or nozzle. The end has a generally hollow cylindrical form. Inside of the end, the insert has its second chamber 31, generally smooth walled of a constant diameter. The chamber extends through the end for the length of the threads and the second notch 8. Proximate the second collar, the chamber widens to a slightly larger diameter for a short distance, or step, as at 32d, to receive the rounded perimeter of the snap cone 16. Within the second collar, the chamber returns to its diameter until it merges with the second throat 32 slightly inwardly from the collar. The wider diameter is shown as line 32a, that of the second chamber 31. Inward of the wider diameter, the second throat angles radially inwardly for a short distance to the second wider diameter, line 32b. From second wider diameter line 32b, the second throat abruptly widens to a second step as at 32c. The second step has a larger diameter than the wider diameter 32b. The second step leads to a third chamber 33. The third chamber admits the cylindrical inner extension 28 of the body 5 while the wall 30 fits into the inner notch 27 and with the outer extension 24. The transition in second chamber diameter from the second throat 32 to the third chamber 33 occurs over a constriction 34 within the insert. The constriction reduces the diameter of the second throat by approximately 40% as it transitions from its wider diameter to the second wider diameter proximate the third chamber at the second step. The constriction, being hollow and round like the throat allows for the passage of fuel through it with the least amount of adverse fluid flow effects.

Figure 11:
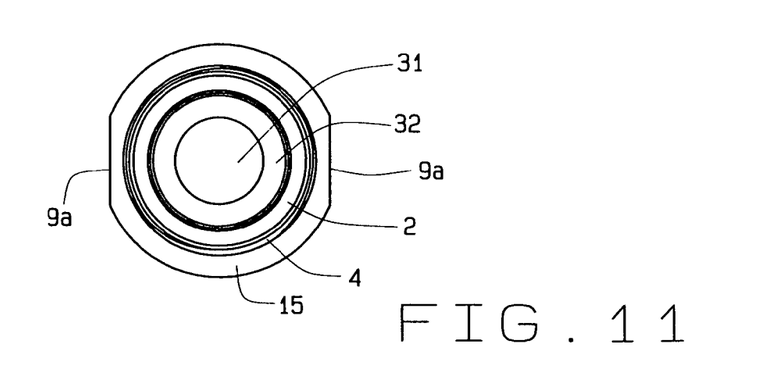
FIG. 11 describes an end view of the body with the collar in the background.

FIG. 11 then illustrates the insert 6 from its end 3 where in the background, the insert has its second collar 15. The second collar has a generally round shape but for two mutually parallel faces 9a here shown upon a common diameter. The faces also receive the jaws of a tool, such as a wrench, as previously described. Inwardly from the second collar, the insert has its threads 4 upon the end 3. The threads extend around the circumference of the end in a generally tight helical manner. Inwardly from the threads and in the general center of the figure, the end 3 shows the third chamber 33 that receives fuel from the chamber 27 of the body which transmits the fuel through the constriction 34 that transitions the inner diameter of the wall from its narrowest, as at line 32 b, through the throat 32 to the inner diameter, as at line 32a of the second chamber 31.

Figure 12:
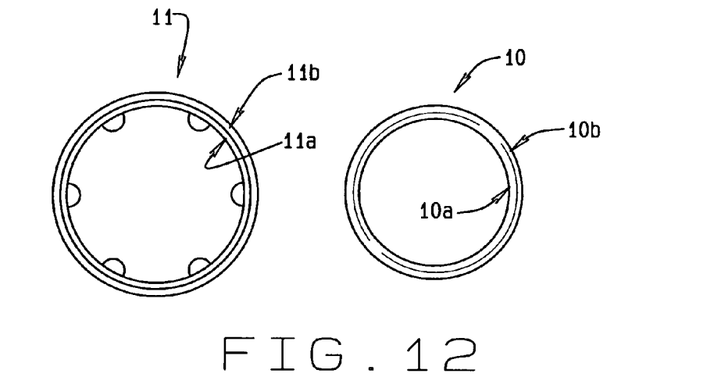
FIG. 12 describes a top view of the O-ring and gasket for the alternate embodiments of the present invention.

Generally for closing off the threaded connection of a hose or fitting to the connector proximate the notches 7, 8, the connector provides the gasket 11 and the O-ring 10 as shown in FIG. 12. The O-ring 10 is generally round within an inner edge 10a at an inner diameter and an outer edge 10b at an outer diameter greater than the inner diameter. The O-ring has a generally round cross section, radially, between the inner edge and the outer edge. The inner diameter is generally slightly more than the diameter of the adaptor at the notches but less than the diameter of the thread 4. The O-ring has a material that allows for slight stretching for placement over the threads and compression by a hose or other fitting when connected thereto. Alternatively, the connector has the gasket 11, generally round, with an inner rim 11a at an inner diameter and a rim 11b at the outer diameter of the gasket. The inner diameter of the gasket generally exceeds that of the O-ring. The inner rim and rim of the gasket form a generally square cross section as later shown in FIG. 14. Upon the inner rim, the gasket has a plurality of spaced flutes 13. Here the flutes have a generally semi-circular shape extending inwardly into the gasket, towards its nominal center. The radius of each flute begins at the inner rim and turns through 180 degrees of arc. Preferably, the gasket has an even number of flutes, here shown as six. The flutes engage the threads 4 of the body 5 and insert 6 and allow a user to rotate the gasket to a desired position upon the each end of the connector. Either gasket or O-ring are used, but not both, are used for sealing either end of invention.

Figures 13, 14:
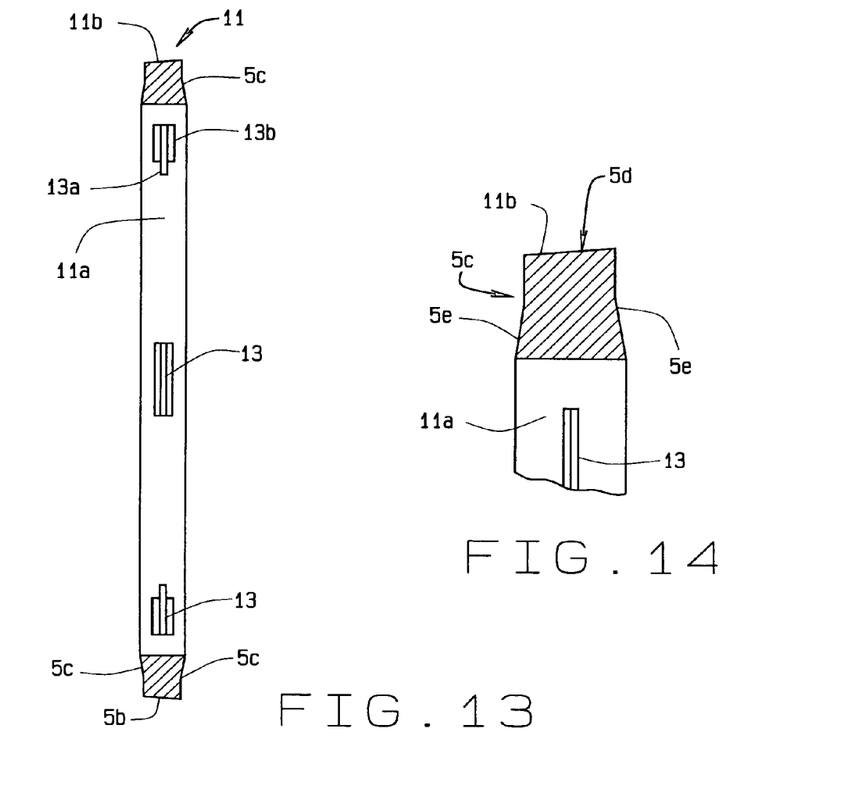
FIG. 13 shows a sectional view of the gasket.
FIG. 14 shows a detailed view of the edge of the perimeter of the gasket.

FIG. 13 then shows a cross sectional view of the gasket 11. The gasket has the rim 11b, also shown at 5b, that faces outwardly from the gasket and connector when installed, and the opposite inner rim 11a upon the interior of the gasket. Perpendicular to the rim and the inner rim, an edge 5c joins the two rims upon both sides of the gasket. The edges and the two rims generally form a square cross section as shown in the top and the bottom of the figure. Upon the inner rim, the gasket has the flutes 13, generally equally spaced. Each flute has a thin tip 13a away from the inner rim than merges with shoulders 13b of greater thickness than the tip. The shoulders join to the inner rim. The flutes and the tips extend inwardly, that is, away from the inner rim.

FIG. 14 then shows the perimeter of the gasket more closely. Though showing a portion of the perimeter in this figure, the structure extends upon the entire perimeter of the gasket. The gasket has the inner rim 11a with a flute 13, rim 11b, and edge 5c as before. The rim though in this embodiment has a slight slope 5d, extending from left to right in the figure. The slope is approximately 1 to 4 degrees and oriented so that the bottom of the slope advances towards the collar upon turning the gasket on a stem. The edge 5c further includes a taper 5e partially along the length of the edge. The taper begins at the thickness of the gasket and then narrows slightly about midway along the edge.

Figures 15A, 15B:
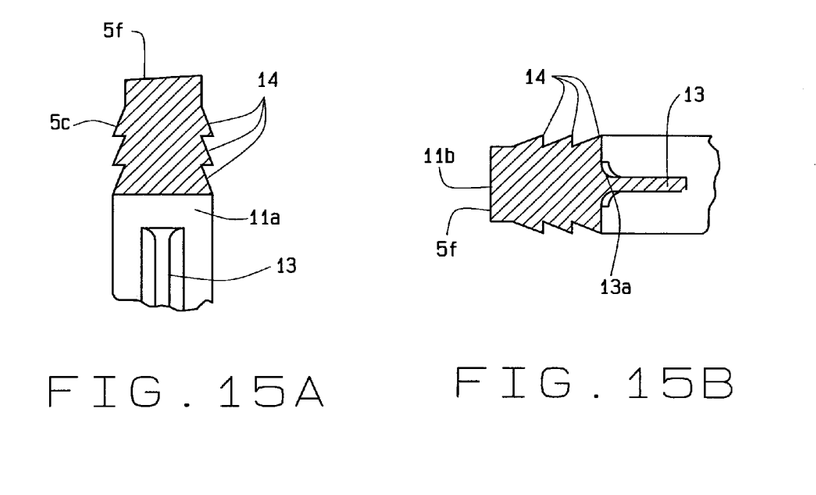
FIG. 15a provides a detailed view of an alternate embodiment of the edge of the perimeter of the gasket.
FIG. 15b provides a detailed view of an alternate embodiment of the edge of the perimeter of the gasket.

Another form of the edge 5c appears in FIG. 15a with a perimeter sectional view. The gasket begins with a flute 13 upon the inner rim 11a with the opposite, or outwardly, rim 11b as before. The rim has its slope 5d outwardly from the inner rim similar to that shown in FIG. 12. Unlike the smooth edges 5c, this embodiment has three mutually spaced apart barbs 14 here shown in section. The barbs appear as concentric rings upon the edges when see as in FIG. 12. The barbs, as a group, extend at least midway from the inner rim to the rim. The barbs have their narrowest portion outwardly towards the rim and their thicker portion inwardly towards the inner rim. Outwardly from the barbs 14, the gasket has a tip 5f generally proximate the rim. The tip generally lacks barbs or other securing surface features. FIG. 15b orients the sectional view to a flat orientation as a hose or fitting would abut the gasket. In FIG. 15b though, the rim 11b at the tip 5f is generally square, or without a slope. This figure also shows a partial section of a flute where the tip extends inwardly from the shoulders.

Figure 15C:
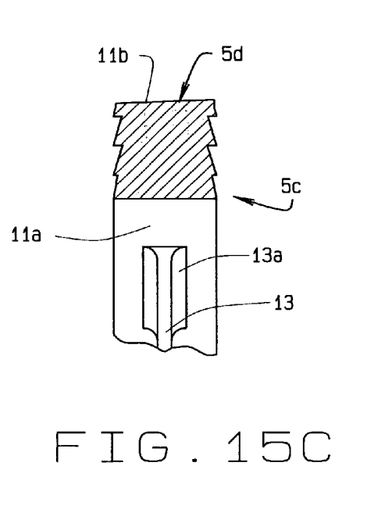
FIG. 15c provides a detailed view of an alternate embodiment of the edge of the perimeter of the gasket; and, FIG. 15d provides a detailed view of an alternate embodiment of the edge of the perimeter of the gasket.
Figure 15D:
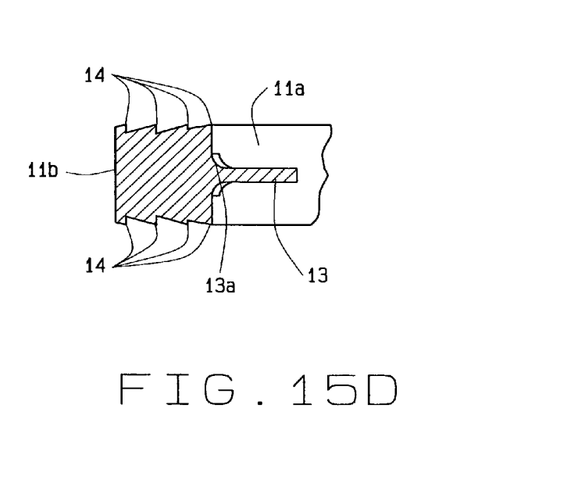

A third form of the edge 5c appears in FIG. 15c, also in a perimeter sectional view. The gasket has its flute extending inward from the inner rim 11a with the opposite, or outwardly, rim 11b as before. The rim has its slope 5d outwardly from the inner rim similar to that shown in FIG. 14. This embodiment also has three mutually spaced apart barbs 14 here shown in section. The barbs appear as concentric rings upon the edges when seen as in FIG. 12. These barbs, as a group, span from the inner rim to the rim. The barbs have their narrowest portion outwardly towards the rim and their thicker portion inwardly towards the inner rim. In this embodiment, the gasket lacks a tip as in the previous embodiments of the edges. FIG. 15d orients the sectional view to a flat orientation as a hose or fitting would abut the gasket. Similar to FIG. 15b, the rim 11b is generally square, or without a slope. The rim also truncates the outer barb on the top and bottom edges. This figure also shows a partial section of a flute where the tip extends inwardly from the shoulders.

Provided for fixed mounting within the body and the insert are spider mounts or snap cones that likewise support the check valves as previously described. The check valves rest within a stem support, formed within the mount and with the springs 20 normally biasing the check valves against the throat, or valve seats, formed within the body and the insert. An O-ring 19 fits on each valve, so as to assure a fluid tight seal when the valve is seated upon its valve seat. A pin 21, towards the interior of the invention or between both check valves, such that when the insert 6 is installed within the body 5 and both within the guard 9, the pin biases against the stem of the oppositely aligned check valves 16 and thereby forces both check valves to unseat from their respective valve seats. In doing so, the check valves remain open to allow for fuel flow through the invention.

The various pressures withstood by the connector of this invention are calculated to furnish the required strength to maintain the breakaway hose connector in its operative configuration, and to resist separation. Obviously, this type of pressure can be varied, based upon the amount of axial force resisted by a given shear pin and its biasing springs built into the device. But, in the preferred embodiment, it has been designed to withstand tensioning forces exerted upon the fuel line hose of at least one hundred pounds, and preferably two hundred fifty pounds. Most of this force is attained through the shear strength of the shear pins engaging the common apertures between the body and the insert. However, upon separation of the insert from the body, the check valves slam shut upon their valve seats in the throats of the body and the insert.

To produce a normal disengagement of the connector device, a tensioning force is exerted upon the fuel line in which the connector is located as previously described. When a tension force is exerted upon the connector, the force is directly upon the body and the insert. As the tension builds, in this embodiment, the same force is exerted upon the connector 1, through its interconnected fuel line, and this force tends to pull the insert 6, slightly out of the outer extension 24 of the body 5 but within the guard 9, in an effort that tends to withdraw the insert slightly from within the body to provide for an instantaneous disengagement of the body from the insert. As this occurs, simultaneously the pin 21 allows the poppet valves or check valves 17 to be spring biased against their respective valve seats as the fuel line falls away.

Thus, when disconnection has occurred, because of the exertion of the tensioning force upon the fuel line in which the connector inserts, and through the exertion of such force physically upon the connector 1 itself, the connector disconnects, the various check valves instantaneously close, preventing the flow or leakage of any further fuel from the end of the fuel line, fitting, or a handle of a nozzle, even though a break has occurred, thereby preventing the hazardous spillage of fuel or other fluids onto the surrounding area, as previously explained.

Thus, this invention provides a single seal breakaway connector that prevents untimely spillage when a disconnection occurs where a fuel line separates during a drive away situation. The connector includes internal check valves that seal off the flow of fuel through the two components threaded upon the connector. The connector also accommodates the various internal pressures that arise from pressure spikes that occur as fuel ebbs and flows through hoses, fittings, and nozzles as the handle is engaged and disengaged by the user.

From the aforementioned description, a single seal breakaway connector has been described. This single seal connector is uniquely capable of a smooth exterior between the body and the insert having a common outer diameter, faces upon both collars suitable for gripping by a wrench or other tool, and a flow constriction interior of the check valves between both the body and the insert. Though the various components and other components are shown and described with round cross-sections, other cross-sections are possible in alternate embodiments. This single seal breakaway connector and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, is set forth for illustrative purposes only.

I claim:

1. A breakaway connector for connecting a hose, a fitting, a nozzle or other attachment, comprising:

a body and an opposite insert, said insert positioning within said body wherein said body and said insert present a smooth exterior, said body and said insert being generally hollow cylinders for passage of fluid;

said body having a first collar defining the width of said body and said insert having a second collar defining the width of said insert, each of said collars having at least two flat faces adapted to receive a tool, each collar having a diameter greater than the diameter of said body and insert said second collar having the same diameter as said first collar;

a chamber extending within said body to a throat, a second chamber extending within said insert to a second throat, said second throat opening to a third chamber receiving said body, each of said chambers and each of said throats adapted to pass fluids there through at minimal adverse effects to flow;

a biased check valve centered within said throat of said body and a biased check valve centered within said second throat of said insert and a pin positioned and centered between said check valves wherein upon application of sufficient axial force to said connector said pin of said body check valve moves away from insert check valve and thus said check valves close immediately;

at least one coil pin joining said first collar and said second collar, to align said body and insert during assembly;

at least three shear pins extending radially between said body and said insert;

said body and said insert each have threading thereon outwardly of said first collar and said second collar;

said body having an open end and threading extending inwardly from said end to a first notch, said first collar locating inwardly from said first notch, an outer extension, generally cylindrical extending inwardly from said first notch opposite said threads, said outer extension having a length at least twice that of said first collar, an inner extension of a lesser diameter than said outer extension, generally cylindrical in shape, said inner extension generally centered within said outer extension, an inner notch forming between said outer extension and said inner extension for receiving said insert, and said inner extension having a centered aperture for fluid passage;

said body having a chamber in communication with said end generally extending for the length of the threads to said first collar and into said outer extension, said throat in communication with said chamber opposite said end, said throat having a wider diameter than that of said chamber and a narrow diameter within said body proximate said inner extension;

said outer extension having at least one aperture there through for receiving at least one of said shear pins;

said insert having an open end and threading extending inwardly from said end to a second notch, said second collar locating inwardly from said second notch, a wall, generally cylindrical extending inwardly from said second collar opposite said second notch, said wall having a length at least twice that of said second collar and a diameter approximately that of said inner notch of said body, a third chamber of a lesser diameter than said wall, generally cylindrical in shape and centered within said insert, said third chamber receiving said inner extension of said body, said third chamber having a centered aperture for fluid passage;

said insert having a second chamber in communication with said end generally extending for the length of the threads to said second collar and into said wall, a second throat in communication with said second chamber opposite said end, said second throat having a wider diameter than that of said second chamber and a narrow diameter within said insert proximate said third chamber;

said wall having at least one aperture there through for receiving at least one of said shear pins;

at least an O-ring and a gasket fitting over said threads, next to said collars, for locating within said first and second notches; and said body and said insert each having said external threading thereon outwardly of said first and second collars to accommodate the connection of one of a hose, fitting, or nozzle when assembled.

2. The breakaway connector of claim 1 further comprising:

said first collar having two spaced apart and mutually parallel faces, said faces being generally parallel to the length of said connector, said first collar being round away from said faces;

said second collar having two spaced apart and mutually parallel faces, said faces being generally parallel to the length of said connector, said second collar being round away from said faces;

said chamber and said second chamber being generally smooth; and, said throat tapering in diameter within said first collar and said second throat expanding in diameter within said second collar wherein said throat and said second throat communicate fluids through a common narrow diameter positioned approximately at the juncture of said body and said insert.

3. The breakaway connector of claim 1 further comprising:

said gasket having an edge positioned upon the perimeter of said gasket, a rim upon the perimeter and an inner rim opposite said rim, said inner rim having at least three flutes extending radially inward, said flutes adapted to engage said threads; and, said edge from said inner rim to said rim having one of a taper, slope, and at least two barbs.

4. The breakaway connector of claim 1 further comprising:

said body and said insert each having beveled ends generally leading into said chamber and said second chamber respectively;

said first collar having two spaced apart and mutually parallel faces, said faces being generally parallel to the length of said connector, said first collar being round away from said faces;

said second collar having two spaced apart and mutually parallel faces, said faces being generally parallel to the length of said connector, said second collar being round away from said faces; and, said chamber and said second chamber each having a smooth surface.

5. The breakaway connector of claim 1 further comprising:

said throat tapering in its diameter over a constriction in said body;

said second throat expanding in its diameter over a constriction in said insert;

said constriction in said body and said constriction in said insert serving as seats for said check valves wherein said constriction in said body and said constriction reduce fluid flow rate through said connector to a minimum.

6. The breakaway connector of claim 1 wherein said gasket is of a round configuration, being generally square in cross-section, forming an outer rim and an inner rim, said inner rim having a plurality of spaced flutes, said spaced flutes having a substantially semicircular shape extending inwardly from the inner rim of said gasket, wherein said gasket flutes engage the threads of the body and insert during their application to the breakaway connector.

\* \* \* \* \*